Figure 1:
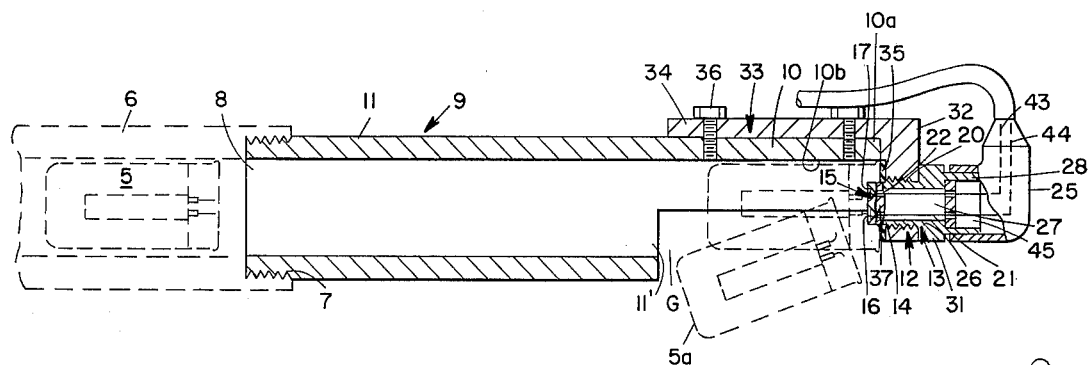

United States Patent [19]

Larson

[11] 3,937,296

[45] Feb. 10, 1976

[54] FIRING DEVICE, EXPLOSIVE CHARGE, METHOD, AND SYSTEM, FOR SEISMIC EXPLORATION

[75] Inventor: Richard R. Larson, Ulster Park, N.Y.

[73] Assignee: Hercules Incorporated, Wilmington, Del.

[22] Filed: Feb. 26, 1970

[21] Appl. No.: 14,321

Related U.S. Application Data

[63] Continuation-in-part of Ser. No. 818,475, April 21, 1969, Pat. No. 3,574,298.

[52] U.S. Cl................. 181/118; 340/7 R; 181/110; 181/114
[51] Int. Cl.²....................... G01V 1/38; F42D 3/06
[58] Field of Search............ 181/.5 XC, .5 IC, .5 H, 181/.5 AG, .5 RS, 110, 114, 118; 340/7 R, 386

[56] References Cited
UNITED STATES PATENTS

| 3,187,831 | 6/1965 | Smith, Jr. | 181/.5 NC |
|---|---|---|---|
| 3,360,070 | 12/1967 | Cholet et al. | 181/.5 IC |
| 3,368,641 | 2/1968 | Cholet et al. | 181/.5 IC |
| 3,382,946 | 5/1968 | Smith, Jr. et al. | 181/.5 XC |
| 3,491,687 | 1/1970 | Cholet | 181/.5 XC |
| 3,496,532 | 2/1970 | Thigpen | 181/.5 XC |
| 3,509,961 | 5/1970 | Fitch | 181/.5 NC |

*Primary Examiner*—Maynard R. Wilbur
*Assistant Examiner*—W. Moskowitz
*Attorney, Agent, or Firm*—S. Grant Stewart

[57] ABSTRACT

A firing device is provided for initiation of delay type seismic charge assemblies, which comprises means for conveying and guiding the charge assemblies, in the seismic test zone, into electrical initiation contact with one of any number of available pairs of electrical conductor surfaces, insulated from the other and adapted to connect with opposite poles of an external firing current source; and means for directing the thus initiated assemblies from the initiation zone, during the delay period, for subsequent detonation.

Also provided are elongated end-recessed seismic charge assemblies initiated in the above device; and seismic exploration system, and method, utilizing said device.

22 Claims, 9 Drawing Figures

RICHARD R. LARSON
INVENTOR.

S Grant Stewart

BY

ATTORNEY

RICHARD R. LARSON
INVENTOR.

BY

ATTORNEY

FIRING DEVICE, EXPLOSIVE CHARGE, METHOD, AND SYSTEM, FOR SEISMIC EXPLORATION

This application is a continuation-in-part of my copending application Ser. No. 818,475, filed Apr. 21, 1969, now U.S. Pat. No. 3,574,298.

This invention relates to firing of explosive charges to generate seismic disturbances. In one aspect this invention relates to a firing device for sequentially electrically initiating explosive charges in a body of water and then directing the initiated charges outside the system for detonation in a seismic exploration zone. In another aspect this invention relates to electrically initiatable seismic explosive charge assemblies for underwater initiation in a firing device above described. In another aspect this invention relates to a system, including the above firing device, for generating seismic disturbances in a body of water. In another aspect this invention relates to a marine seismic exploration method utilizing the above system. Other aspects of the invention will be apparent in light of the accompanying disclosure and the appended claims.

Seismic exploration involves the introduction of energy into the earth to initiate wave action for determination of subsurface structure characteristics, and is based on the generation of seismic disturbances, or waves, in the earth's surface which are reflected or refracted from buried strata interfaces, and the like.

It has been general practice to detonate high explosives as the energy source for seismic exploration inasmuch as the energy generated provides for excellent seismic records. Unfortunately, in offshore exploration, shock energy from detonation of high explosives, particularly in large amounts, is unduly damaging to certain marine life including many of the important food and game species. Transport of high explosive seismic charges to the offshore seismic shooting site is subject to the limited quantity that governing authorities permit on the loading dock at any one time to minimize the safety hazards involved, which, in turn, limits the amount of high explosives that can be handled on the dock and impairs the efficiency at which the explosives can be loaded across the dock and transported to the exploration site. Particularly for these reasons the industry, in offshore practice, has turned to the use of nitrocarbonitrate (NCN) type seismic charges.

In offshore seismic exploration practice, the complete seismic charges are assembled on deck of a boat moving through the test area and then emplaced from the boat and detonated. General offshore technique in the handling of NCN charges on board ship has involved inserting a primer into the charge, inserting an electrically actuated detonator into the primer, attaching a depth control (float and string) to the assembled charge, and placing the charge in the water. Concurrently the boat travels at about six knots for a period sufficient to place a predetermined length of firng cable (position locater). Each such cycle requires a minimum of about two minutes, and accordingly, requires large charges, generally of from 50 to 100 pounds, in order that a sufficiently strong signal be emitted at each test point.

The use of such large NCN charges is disadvantageous in many respects, viz: (1) explosive force from each detonation imparts damage to the hydrophone cable unless the cable is carried at a great distance from the detonation, and accordingly, general practice has been to utilize an additional boat for the cable thus incurring marked increase in costs; (2) a large quantity of these charges is necessarily maintained aboard ship which, in addition to the safety hazards involved, is economically undesirable from the standpoint of space, already at a premium, that must be available for storage; (3) such charges are of size and weight that they are difficult to handle aboard ship and particularly in heavy seas, and they require extensive manpower for loading at the dock and for being handled aboard ship for assembly and emplacement; (4) use of large NCN charges, in some instances, results in induly high fish kill; and (5) electrical communication lines, often of from 50 to 100 feet in length, extending from the boat deck to the charge, and auxiliary equipment, are always susceptible to becoming entangled to impair success of the shot, sometimes resulting in loss of the charge.

Small nitrocarbonitrate charges have been used in offshore seismic practice in an effort to overcome the disadvantages inherent in the use of larger charges. Such use of small nitrocarbonitrate charges has required emplacement and detonation of a proportionately larger number of charges in a given test area which in turn has required emplacement and shooting of charges more rapidly than were necessary in accordance with earlier practice. However even more so than for larger charges, the use of smaller charges has been seriously impaired by the unwieldy handling of the various communication lines from the boat to the charge and accordingly no appreciable advance has been provided by use of the smaller charges.

This invention is concerned with a firing device for rapidly and sequentially initiating small seismic charges in an underwater zone and for then directing the initiated charges to an external point for detonation to provide a strong seismic record and for doing so without damage that might otherwise be imparted to the firing device by force of the detonation, and at a rate providing energy necessary for compensation of that normally delivered by larger, but less frequently fired, charges. The invention is further concerned with such explosive charge assemblies, and with a seismic exploration system containing, and a seismic exploration method utilizing, such firing device.

In accordance with the invention a firing device for initiating delayed electrically initiatable seismic charge assemblies and then delivering the initiated charges for detonation outside the firing system, is provided, which comprises means for sequentially directing said charge assemblies along a path of continuous forward travel for electrical initiation of same; means, at a forward point on said path of travel, for receiving electric current for electrically initiating said charge assemblies and for contacting said charge assemblies as they travel along said path to transfer said current to said charge assemblies for initiation of same; and means for directing the thus initiated charge assemblies from said firing device during the delay period. Generally, the firing device includes open means for sequentially guiding the charge assemblies along the path of continuous forward travel; means for conveying the charge assemblies sequentially to the open guiding means and then into the path of continuous forward travel; and the means for effecting electrical contact with the charge assembly is supported at a forward point on the guiding means.

The now preferred firing device of the invention comprises a conduit, and a tray member extending from one end thereof; said tray member being adapted to sequentially guide such charge assemblies along a path of continuous forward travel thereon for electrical initiation of same, and for pivotal travel of the thus initiated charge as described hereinafter; said conduit being adapted to sequentially convey such charge assemblies to said tray and into said path of forward travel; means disposed in said path of forward travel for contact with each said charge assembly to cause electrical initiation of same; and stationary means forward of the initiating contact means for impact with the forwardly moving initiated charge assembly to direct pivotal travel of same from said tray member, about said contact means as a pivot point, in response to the impact.

Further in accordance with the invention, a system for generating seismic disturbances in a body of water is provided, which comprises a movable platform; means on said platform for storage of electrically initiatable seismic explosive charge assemblies; a firing device, as a submersed firing station, comprising (1) means for sequentially directing said charge assemblies along a path of continuous forward travel for electrical initiation of same, (2) means, at a forward point on said path of travel, for receiving electric current for electrically initiating said charge assemblies and for contacting said charge assemblies as they travel along said path to transfer said current to said charge assemblies for initiation of same, and (3) means for directing the thus initiated charge assemblies from said firing device during the delay period; a delivery conduit connecting said platform with said directing means of said submersed firing station; fluid pressure generating means on said platform connecting with said delivery conduit for sequentially moving said charge assemblies from said platform through said delivery conduit to said directing means, and then into and along said forward path of travel for said initiation.

The submersed firing station in the system of the invention is generally the now preferred firing device, often of integral construction, described more fully herebelow. Although the system can utilize any suitable movable platform, the latter is generally the deck of a boat for towing the firing station through the marine seismic zone.

Although any suitable means can be utilized in combination with the above described system, for detecting water pressure variations caused by the seismic disturbances, a streamer cable coupled to a tow boat as the movable platform, in combination with conventional auxiliary means on the boat deck, is generally utilized.

Further in accordance with the invention a seismic exploration method is provided wherein complete delayed electrically initiatable seismic charge assemblies are emplaced and fired in an underwater zone to provide energy for a seismic record, said method comprising sequentially conveying a plurality of said charge assemblies into, and along, a path of forward travel in said underwater zone; sequentially contacting said assemblies while they travel with a contact means disposed across said path of travel and including opposite poles of a firing current source so as to electrically initiate said charge assemblies concurrently with said contacting; and during the period of delay, sequentially directing travel of the thus initiated charge assemblies from the zone of the initiation into an adjacent area in said underwater zone for detonation. Generally, travel of the initiated charge from the initiation zone is directed pivotally about the electrical contact means as a pivot point; and, in general practice, a delivery tube, extending into the underwater seismic shooting zone, and connecting therein with the rearward end of a firing device of the invention, is towed through the shooting zone, and the seismic charges are sequentially delivered through the tube into the rearward end of the firing device for conveyance along the path of forward travel for the initiation, and subsequent detonation.

Further in accordance with the invention, an explosive charge assembly, for underwater seismic exploration, adapted to be electrically initiated upon traveling in the seismic shooting zone into contact with opposite poles of an electrical firing current source, and then directed away from said contact for subsequent detonation, is provided, which comprises an elongated shell having a closed interior along a portion of its length and an open end section adjacent the shell interior; a small seismic explosive main charge within said shell interior, and an electrically initiatable primer device for said main charge, supported therein and containing electrical conductor leads extending into said open end shell section for conveying electrical firing current from said firing current source for initiation of said primer; said conductor leads extending rigidly into said end section in substantially parallel relationship, and spaced apart at an angle greater than 90° having its vertex on the longitudinal axis of said shell and measured in a plane normal to said axis.

Figure 1A:
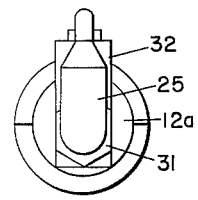
Figure 2A:
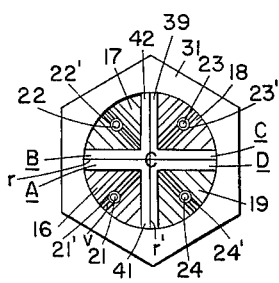
Figure 2:
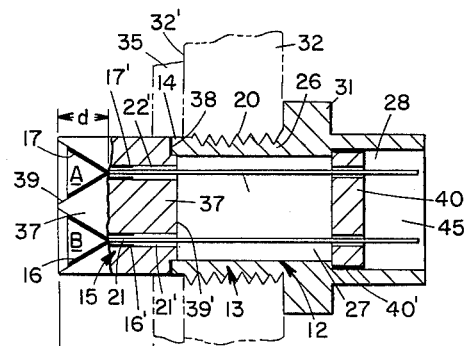
Figure 2B:
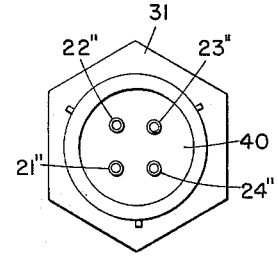
Figure 3:
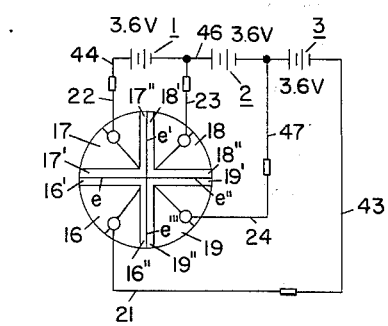
Figure 4:
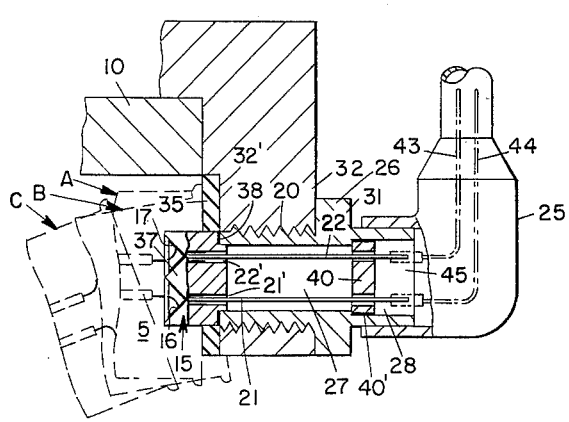
Figure 5:
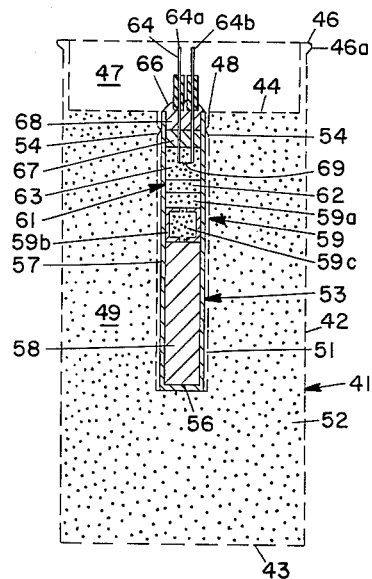
Figure 6:
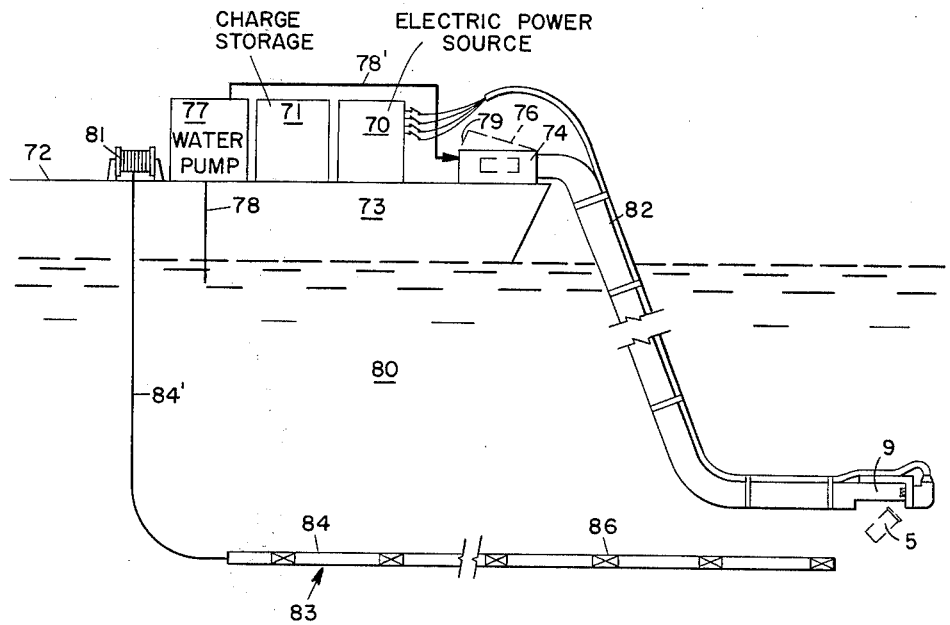

The invention is illustrated with reference to the drawings of which FIG. 1 is a cross-sectional view of a now preferred embodiment of firing device including a conduit-tray assembly of integral construction together with an electrically initiating contact assembly and separate impact means for directing travel of the initiated charge from the device for subsequent detonation, and FIG. 1A is a forward end view thereof; FIG. 2 is an enlarged view, partially in cross section, of the contact assembly of FIG. 1, FIG. 2A is an end view of the non-sectioned portion of FIG. 2, and FIG. 2B is an unsectioned view of the opposite, and sectioned, end of the contact assembly of FIG. 2; FIG. 3 is also a view of the unsectioned end portion of FIG. 2, together with a diagram of now preferred firing current flow utilized in practice of the invention; FIG. 4 is an enlarged view of that portion of the device of FIG. 1 more clearly illustrating the manner in which the seismic charge is electrically initiated and directed for detonation outside the system; FIG. 5 is a cross-sectional view of a now preferred form of electrically initiatable delayed seismic charge assembly fired in a firing device of the invention; and FIG. 6 is a diagrammatic illustration of seismic exploration system, and method, utilizing a firing device of the invention. Like parts in the various figures of the drawings are identified by like index numbers.

Referring to FIG. 1, electrically initiated explosive charge assembly conveyor, or directing, conduit 11 of firing device 9 is threaded (threads 7) at rearward end 8 for connection with a suitable hose type delivery conduit 6 for sequentially receiving elongated electrically initiatable delay type seismic charge assemblies 5 from hose 6 and then conveying them through forward end 11' for electrical initiation.

Open guide-support means 10 is a suitable tray type member adjacent and immediately forward of conduit 11, and is in open communication and direct alignment with conduit 11 for sequentially receiving the delay type seismic charge assemblies from conduit 11, as they are moved axially from conduit 11; and for guiding each charge assembly along a path of continuous forward travel to contact assembly 12, at or near the forward end 10a of guide member 10. Guide member 10 is open for travel of the seismic charge assembly therefrom, as described further herein.

Although tray type guide member 10 and conduit 11 can be connected in any suitable manner, as illustrated hereinafter, they constitute, in preferred practice, a single unit of integral construction, as shown. Conduit 11 and guide member 10 as an integral unit can be fabricated by cutting a relief from one end of a tube, or pipe, member along a suitable circumference say of from about 180° to 300°. Regardless of whether conduit 11 and guide member 10 are of integral construction, guide member 10 is of shape and is secured to conduit 11 to sequentially receive the axially moving seismic charge assemblies from conduit 11 and guide them in a line of continued forward travel, maintained under force of fluid pressure toward contact assembly 12 at the forward end 10a. In a now preferred form, the inner wall 10b of guide member 10 is substantially coplanar with an adjacent inner wall portion of conduit 11 to facilitate travel of the seismic charge assembly from conduit 11 onto guide member 10.

Although the inside diameter of the conduit 11 of FIG. 1 can be constant, it is often advantageous that at least a rearwardmost end portion thereof be tapered in a forward direction to facilitate arrest and positioning of the charge assembly for conveying it to the guide member 10. Also, at a given velocity of fluid flow into the conduit an increase in fluid velocity takes place as the taper is continued to thus impart additional momentum to the moving charge assembly for the initiation and subsequent pivotal travel.

Contact assembly 12, in combination with guide member 10, is spaced from the forward end 11' of conduit 11 so that the distance of its rearwardmost point from conduit 11, is greater than the length of the particular seismic charge assembly 5, say from 1.1 to 1.3 times the length of the assembly, to provide a gap G between forward end 11' of conduit 11 and the rearward end 5a of the seismic charge assembly when ready for pivotal travel from guide member 10, as described hereinafter.

Bracket arm 32 and contact assembly 12, supported thereon, are disposed across the forward end of guide member 10 sufficiently to intercept the forward travel of the seismic explosive charge assembly on guide member 10. The total shadow area of contact assembly 12 and its associated structure including bracket leg 32, i.e., the total area filled by that combined structure is sufficiently limited to facilitate linear flow of driving fluid around it from conduit 11, to facilitate guidance and support of the charge assembly along its path of forward travel on guide member 10, as specifically illustrated with reference to FIG. 1A. Contact assembly 12 is positioned so as to facilitate electrical initiating contact of any pair of the electrical conductor surfaces thereon with the seismic explosive charge assembly traveling on member 10. Generally, the assembly 12 is disposed so as to be in a central portion of the path of forward travel of the charge assembly.

Contact assembly 12, also shown in enlarged detail in FIG. 2, faces conduit 11 and comprises header body 13 with the threaded (threads 20), and rearward, end 14 thereof facing conduit 11 and dielectric piece 15 extending from rearward end 14 of header body 13 and facing conduit 11.

Dielectric piece 15 includes dielectric body 37 having separate electrical conductive surfaces 16–19, inclusive (see also FIG. 2A and elsewhere in the drawings), electrical conductor leads 21–24 (see also FIG. 2A and elsewhere in the drawings) extending forwardly from electrical conductive contact with surfaces 16–19, respectively, through conduits 21', 22', 23', and 24', respectively (see also FIGS. 2A and 3, and elsewhere in the drawings) for connection in pairs via. connector system 25 with opposite poles of an electric firing current source outside the firing device 9.

Header body 13 of contact assembly 12 comprises elongated housing 26 having rearward and forward sections 27 and 28, respectively, extending in series therethrough. Rearward section 27 of housing 26 is externally threaded (threads 20); body 13 being threadably supported about threads 20 in bracket arm 32 extending across the forward end of guide 10 as a part of L-shaped bracket 33 supported by its other arm 34 extending along the exterior of guide member 10 and secured to guide member 10 by screw bolts 36. External nut member 31 forward of threads 20 is integral with housing 26 for engagement of suitable tool means for threadably emplacing header body 13 in arm bracket 32.

Dielectric body 37 extends coaxially with housing 26 rearward of section 27 and is formed from any suitable electrical non-conductor material, generally a ceramic, or glass. Passageways 21', 22', 23', and 24' extend through body 37 substantially parallel to the axis thereof and generally equally spaced apart. Generally housing section 27 is tubular, and dielectric body 37 is cylindrical and connected, often in watertight relationship, with the inner wall of the housing section by a suitable braze 38 at the face of housing 26 rearward of threads 20.

The rearward end view of dielectric piece 15 (see FIG. 2A) i.e., facing conduit 11, further illustrates orientation of conductor surfaces 16–19, incl. As shown with reference to FIG. 2A, the entire rearward end surface 39 of dielectric body 37 forms quadrants A–D, incl., each of which forms a V-shaped trough having the crest formed by a pair of adjacent quadrant radii and the valley defined by a line extending from the quadrant center to the side of body 37 in that quadrant toward the opposite, and forward, end 39' of body 37; each valley often substantially bisecting the quadrant angle and extending at an angle with the axis of body 37 of from about 20° to 30°. Thus, for purpose of illustration, the surface in quadrant A on the rearward end 39 of body 37 forms a trough having radii r and r' at the crest and a valley v extending from center C toward the opposite side 39' of body 37 at an angle of say 30° with the longitudinal axis of member 37; the trough opening from center C through the side of body 37. Quadrant surfaces B–D are similarly disposed. Each of passageways 21', 22', 23', and 24' opens into direct communication with the surface of each quadrants A, B, C, and D, respectively, as separate conduits for conductor lead wires 21–24 extending from surfaces 16–19, respectively, in electrical contact therewith.

Electrical conductor surfaces 16–19, incl., are supported respectively on troughed quadrant surfaces A–D so as to be spaced from the quadrant radii except for which they respectively cover substantially the entire troughed quadrant surfaces. Each conductor surface 16–19, incl., is spaced adjacent quadrant radii along a pair of lines substantially parallel to the boundary radii to form a resulting pair of strips of uncovered quadrant surface adjacent each radius boundary line, and thus electrically insulating the corresponding adjacent conductor surfaces from each other. Thus, each pair (see also FIG. 3) of insulating strips 16' + 17', 17" + 18', 18" + 19', and 19" + 16", disposed between a pair of adjacent electrical conductor surfaces 16–19, incl., forms an insulating edge portion on the rear face 39 of dielectric body 37 to insulate each conductor body from the other; dielectric edge portions (see FIG. 3) e, e', e", and e''', electrically insulating each of the conductor layers 16 from 17, 17 from 18, 18 from 19, and 19 from 16, respectively.

Any suitable electrical connector means can be utilized in practice of the invention. As illustrated, connector means 25 is a system of separate conductor leads, attachable to the forward end 45 of the firing device, see particularly FIGS. 1 and 4, for separate engagement of leads 21–24 extending from spacer 40 and connection of same with the firing current source via lines 43, 44, 46 and 47, respectively, see FIG. 3. Connector 25 fits over the forward end of housing 26 in watertight relationship therewith, with female connections connecting each of lines 43, 44, 46 and 47 respectively, with pins 21–24, incl.

Although contact of the seismic charge assembly with assembly 12, rigidly supported at the end of guide member 10, is sufficient to function both for the electrical initiation and for directing travel of the initiated charge from guide 10, a supplemental impact means is generally utilized to lessen the force striking the electrical conductor surfaces to reduce the chance for physical failure of the system over prolonged operating periods and facilitate direction of travel of the initiated charge for subsequent detonation. Support arm 32, forward of electrical contact surfaces 16–19, incl., is disposed so as also to serve as an impact member for directing travel of the initiated charge assembly from the device, when the charge assembly is recessed at the forward end as illustrated with reference to FIG. 5. Arm 32 extends across the forward end of guide member 10 a distance sufficient for support of contact assembly 12, as described herein, but short of that crossing the entire path of forward travel of the charge assembly. Arm 32 thus imposed across the path of forward travel, facilitates pivotal travel of the charge assembly from the firing device. Generally, a resilient washer type member 35 is positioned at the rearward side 32' of arm 32, to cushion the impact and reduce possibility for incurring damage to the charge assembly before completion of its pivotal travel from the firing device.

Referring to FIG. 5, seismic cartridge assembly 41 illustrates a now preferred embodiment of seismic charge assembly, such as assembly 5 of FIGS. 1 and 4, fired in a firing device of the invention. Assembly 41 comprises elongated cartridge shell 42 with bottom end closure 43 and opposite, and top, wall closure member 44 spaced from open top end 46 to form a resulting recessed open end or shell portion 47 in direct and unobstructed open communication with the outside of shell 42. End closure 44 contains passageway, or opening, 48 extending therethrough to directly communicate recess 47 and interior shell portion 49. Well member 51 extends closed end first through opening 48 into operative contact with seismic charge 52, peferably of the NCN type, to support an electrically initiatable primer device 53 in detonating relationship therewith; and is supported at its open end in wall 44 in watertight relationship therewith in any suitable manner, generally by suitable friction support of indent 54 on the inner wall surface of well 51.

Electrically initiated primer assembly 53 extends into well 51, closed end first, in detonating relationship with charge 52. Elongated primer shell 57 of primer assembly, or device, 53 contains a high explosive base charge 58 such as PETN, Pentolite, Tetryl, and the like, adjacent closed end 56. Primer charge assembly 59 in shell 57 is inclusive of any suitable primer composition and is superposed on high explosive base charge 58. Delay assembly 61, with delay fuse composition 62 is superposed on primer assembly 59 and is of composition and design conventionally used in electric delay blasting caps, and is advantageously pressed in either layered or cored form. The particular delay fuse composition and the degree of press and dimensions thereof, determine the time of burning; and in most embodiments selection of a specific delay fuse composition and correlation of same with the remaining variables in such as to provide a delay time in the order of from about 0.5 to about 2.0 seconds. Ignition composition 63, superposed on primer assembly 59, is that conventionally utilized in electric blasting caps. Lead wires 64 extend into primer shell 57 through open end 66 and through conventional sealing plugs 67 and 68, terminating in ignition composition 63 and are connected therein by conventional resistance, or bridge, wire 69.

Delay fuse composition 62 is ignitable in response to ignition of ignition charge 63 and is spaced in ignition relationship therewith, ignition composition 63 being ignitable in response to heat developed by passage of firing current through bridge wire 69 via leg wires 64. The primer composition of assembly 59 is detonatable in response to heat and flame emitted from burning of delay fuse composition 62 and is disposed subjacent delay fuse 62 in detonating relationship therewith. High explosive charge 58 is detonatable in response to detonation of the primer composition and is disposed subjacent primer assembly 59 in that detonating relationship.

In a primer device of a complete charge assembly with which the invention is concerned, the ignition, primer, delay and base charge compositions are advantageously those utilized as such in the blasting cap art, for example, ignition charges such as lead-selenium, high explosive base charges such as pentaerythritol tetranitrate, pentolite, cyclonite, tetryl, RDX and cyclotol; primer charges such as diazodinitrophenol, lead azide and mercury fulminate; and delay fuse compositions such as lead oxide/boron (98/2), red lead/boron (98/2), barium peroxide/tellurium/selenium (40/40/20), barium peroxide/tellurium (60/40).

In preferred practice primer assembly 59 comprises a diazodinitrophenol wafer 59a pressed above, and superposed on elongated capsule 59b which extends within and substantially coaxially with shell 57 in closing, or near closing, relationship therewith. Capsule 59b is open at each end and is superposed on base charge 58 and contains a second diazodinitrophenol charge 59c of density lower than that of primer wafer 59a. Wafer charge 59a is of sufficiently high density to be ignitable in response to contact with flame from ignition of delay fuse composition 62 as above described and diazodinitrophenol charge 59c is of sufficiently low density to be detonatable in response to heat developed by ignition of wafer charge 59a to thereby in turn cause detonation of base charge 58.

The amount of high explosive charge 58 in an assembly 53 of FIG. 5 generally is greater than that utilized as base charge in a conventional No. 8 commercial blasting cap. For example, the amount of PETN, as a base explosive charge 58 is generally in the order of from about 0.8 to 1.5 grams as compared with the conventional amount of 0.4 gram utilized as base charge in a No. 8 electric blasting cap. The amount of primer charge, e.g., charges 59a + 59c, of FIG. 5, is generally about the same as utilized in a conventional No. 8 blasting cap, often being from about 0.28 to 0.30 gram. The amount, degree of press and dimensions of delay fuse 62, is dependent on the correlation of those variables with the desired burning rate, from 0.3 to 0.4 gram of delay fuse composition often being utilized, whether of the pressed layer or core type.

Lead wires 64 emerge from the interior of primer assembly 53 into recessed shell portion 47 of assembly 41 and in some instances they extend from, and beyond, recess 47 dependent upon the requirements of the particular firing device.

FIG. 3 diagrammatically shows the system of firing circuits of contact assembly 12, together with associated circuits connecting same with, and including, an external firing energy source, for receiving the electrical firing energy from the source and delivering same to the bridge wire for electrical initiation of the charge. The various circuits of FIG. 3 for opening through the bridge wire section 69 when each conductor surface of any pair of surfaces 16–19 is separately contacted by one of the two bared terminal ends 64a and 64b of lead wires 64, are summarized as follows:

potassium nitrate, barium nitrate, sodium perchlorate, ammonium perchlorate, calcium perchlorate and magnesium perchlorate. Well known sensitizer materials for nitrocarbonitrates include DNT and particulate aluminum alone or together with suitable fuels such as, for example, powdered coal, fuel oil, ferrosilicon, ferrophosphorous and the like. The following formulations (weight percent bases) are further illustrative of nitrocarbonitrate type charges above described and now preferred in practice of the invention:

|  | A | B | C | D | E | F |
|---|---|---|---|---|---|---|
| Ammonium Nitrate[1] | 82 | 91 | 86 | 79 | 91 | 78 |
| Sodium Nitrate | — | — | — | 10 | — | — |
| DNT[2] | — | 5 | — | 5½ | 5 | 5 |
| Aluminum[3] | 6 | — | 10 | — | — | 12 |
| Fuel Oil | 4 | — | — | 1½ | — | 1 |
| Ferrosilicon | 8 | — | — | — | — | — |
| Ground Coal | — | 4 | 4 | 4 | 4 | 4 |

[1]Ground prills, formulations A, B, C and D; granular, formulations E and F
[2]Dinitrotoluene oil, formulations B, D and E; solid dinitrotoluene, formulation F
[3]Flake, formulations A and C; granular, formulation F The generally preferred nitrocarbonitrates contain (weight basis) from about 75 to 95 percent total inorganic oxidizer salt and at least 5 percent of a suitable sensitizer component together with a separate fuel component when desired. More often ammonium nitrate, preferably in the form of ground prills, is the only inorganic oxidizer salt although it can be advantageously utilized as such, in an amount of from 75 to 90 percent together with from about 1 to 15 percent sodium nitrate. Now preferred sensitizer components are DNT oil, DNT solids, particulate aluminum, and mixtures of any two or more thereof, in a total amount of from about 5 to 20 percent, at least about 5 percent of

| Conductive Surfaces Contacted | The Firing Circuits | | | | | | |
|---|---|---|---|---|---|---|---|
|  | Assembly 12 | | | External Firing Energy Sources | | Assembly 12 | |
|  | Surface | Pin | Lead | Battery(s) | Lead | Pin | Surface |
| 16 + 17 | 16 | 21 | 43 | 3, 2, 1 | 44 | 22 | 17 |
| 16 + 19 | 16 | 21 | 43 | 3 | 47 | 24 | 19 |
| 19 + 18 | 19 | 24 | 47 | 2 | 46 | 23 | 18 |
| 18 + 17 | 18 | 23 | 46 | 1 | 44 | 22 | 17 |
| 16 + 18 | 16 | 21 | 43 | 3, 2 | 46 | 23 | 18 |
| 19 + 17 | 19 | 24 | 47 | 2, 1 | 44 | 22 | 17 |

In preferred practice, the main charge of the complete seismic charge assembly is a nitrocarbonitrate by which term ("nitrocarbonitrate") is meant there are no sensitizers or other ingredients in that composition which are high explosives, and the mixture will not detonate with a No. 8 blasting cap when packed for shipment.

Nitrocarbonitrate type explosive charges, as is well known, contain at least one inorganic oxidizer salt, a fuel, and a suitable sensitizer together with various other well known ingredients such as one or more of an antiset agent, water repellent coating material or the like. Most often ammonium nitrate is the chief inorganic oxidizer salt ingredient alone, or with sodium nitrate or other suitable inorganic oxidizer salts. Further exemplary of inorganic oxidizer salts that can be used alone or together with ammonium nitrate as the inorganic oxidizer salt ingredient of nitrocarbonitrates are alkali metal and alkaline earth metal nitrates and perchlorates (including ammonium) as for example sodium nitrate, magnesium nitrate, calcium nitrate, the particulate aluminum being flake. Also, in preferred practice, the nitrocarbonitrate charge contains, as a separate fuel component, fuel oil, ground coal, granular aluminum or a mixture of two or more thereof, in any suitable amount, generally from 2 to 15 percent.

When referring herein to small nitrocarbonitrate seismic charges, it is meant those which generally have a weight from 150 to 3 lbs. and a diameter of at least ½ inch and usually not exceeding about 3 inches. However, in some off-shore exploration areas, a nitrocarbonitrate charge of any suitable size can be utilized and indeed the explosive charge can be a dynamite or other suitable high explosive.

In the operation of the firing device, in accordance with a now preferred embodiment of the invention, illustrated with reference to the drawings, a complete charge assembly 5, such as assembly 41 illustrated with reference to FIG. 5, is transferred from a supply source under force of fluid pressure (generally pressure of water pumped from an adjacent water body) into delivery conduit 11, recessed end first, into and conveyed through conduit 11 to guide member 10 and into a path of continuous forward travel on member 10 for the electrical initiation. The charge assembly continues forward travel on tray 10 under force of the fluid pressure and is guided along that path of travel not only by side wall portions of the member 10 but by force of flow of water (in the water immersed device) displaced by the forward traveling charge assembly, which passes the contact member 12 by virtue of the small shadow area of assembly 12 and arm 32, as illustrated with reference to unobstructed area 12a intermediate assemblies 12 and 32 and the inner wall 10b of member 10. The charge assembly is guided on tray 10 in alignment with the contact assembly, and is directed toward contact assembly 12 so as to cause each of the electrically uninsulated ends 64a and 64b of the lead wires 64 to contact a separate conductor surface of surfaces 16-19, on the face 39 of member 12.

The depth of recess 47 of the charge 5 is at least as great as, and the depth of each trough surface 16-19, incl., is less than, the length of that portion of contact assembly 12 extending rearwardly from impact means 35. Each of lead wires 64 terminates within the recess 47 but near the end 46 thereof so as to ride along, or move toward, the bottom of each of the particular pair of conductor surfaces and then be forced, and often crushed, into the requisite electrical contact. Hence the longitudinal distance d from center C to the forward end of each valley, is less than the distance $d'$ of the contact assembly rearwardly of the impact member 35. When assembly 5 has traveled to the forewardmost position, the end 46 has abutted impact member 35 and wires 64 have, in the instance shown, straddled insulating strip e and ridden along conductor surfaces 16 and 17 into direct electrical contact therewith. However, because the length of each wire in recess 47 is greater than the depth of the trough into which it is moved, it is crushed, or, alternatively, caused to bend back, against the conductive surface to permit complete forward travel of the assembly to the impact means.

It is necessary that the lead wires be of sufficient gauge and that they be so disposed, so as to extend from the interior of the charge assembly 41 into the recessed area 47 with suitable rigidity and in spaced relationship with each other so as to avoid electrical contact of the two wires with the same conductor surface. In this manner, independently of the particular degree of rotation of the charge assembly, the spaced wires in recess 47 "straddle" the center C, or one of the insulator edge portions $e, e', e''$, or $e'''$, of the dielectric piece 15 and, then, in response to continued forward travel of the charge they spread so as to "ride" along the separate conductor surfaces for the electrical contact. As diagrammatically illustrated in FIG. 3, regardless of which pair of conductor surfaces is contacted, the circuit is completed to lead firing current into the charge to ignite the ignition mixture and hence initiate the charge. To assure that the separate lead wires contact separate conductor surfaces, the lead wires 64 extend within recess 47 in substantially spaced apart relationship at an angle, greater than 90°, having its vertex on the longitudinal axis of the charge assembly shell and measured in a plane normal to the shell axis.

When charge assembly 5 comes into contact with contact assembly 12, lead wires 64 establish electrical contact with the firing current source through any two conductive surfaces to cause electrical initiation of the charge and, within the set period of delay, the charge member is moved forward, with the recess end encompassing contact assembly 12, until the rim 46a of the forward end 46 of the charge assembly impacts resilient washer type impact member 35 for travel from the firing device.

Upon contact of the charge assembly with contact assembly 12, initiation of the charge takes place with burning of the delay fuse to delay detonation of the primer and the base charges to provide time for pivotal travel of the initiated charge about contact assembly 12 from tray member 10 for detonation at an external point.

As the charge assembly comes to a stop upon contacting the assembly 12, driving fluid still flowing through conduit 11 flows away from the device through the rear spacing, or gap G, which unbalances the assembly unit and causes it to pivot about contact assembly, as the pivot point, and to thus pivotally travel from the device, as illustrated. However, in this embodiment, particularly as illustrated with reference to FIG. 4, it is preferred that the bracket member 32 extend from guide member 10 short of complete interception of the path of forward travel of the seismic charge assembly so that upon impact (A) of the charge assembly with the member 35, the forward momentum of the assembly at points out of contact with member 35 will not be arrested and will therefore facilitate pivotal travel (B) of the charge assembly about the contact assembly 12 for travel (C) to the shooting zone.

Although in the embodiment described, the contact member of the firing device of the invention has four separate electrically conductive surfaces, any number of conductive surfaces suitably disposed as one or more separate conductor pairs can be utilized.

In one such additional embodiment, the end surface of the dielectric body facing the conveyor conduit 11 of FIG. 1, i.e., facing the line of forward travel of each charge assembly, is shaped as a V having the vertex along a line through the center C (FIG. 2A) with its sides extending toward the forward end, and through the side, of the dielectric body. The V-shape member, except for the rearwardmost insulating edge portion, is substantially completely covered with an electrically conductive material, and the resulting electrical conductive surfaces are connected with suitable lead means for communicating the conductive surfaces with a firing current source outside the device.

In the operation of that embodiment, to assure that the terminating and bared ends of the conductor wires are disposed for forward travel of each wire into contact with a separate conductor surface, the lead wires extend from the primer shell in substantially parallel relationship, spaced from each other on opposite sides of the charge axis on a line of centers passing through the axis; and each lead wire terminates in an L with the terminating ends of the L's angularly extending from the line of centers of the parallel legs of the L's in opposing directions toward the shell exterior. In that manner, independently of the degree of rotation of the charge assembly upon initial contact with the contact assembly, the lead wires are guided so as to "straddle" the insulating edge portion and thus move into electrical contact with the separate electrical conductive surfaces.

Although in preferred practice, the forwardly moving charge assembly is moved pivotally from the firing device, it can be moved laterally from guide member 10 in the manner disclosed, and illustrated, in my copending parent application Ser. No. 818,475, filed Apr. 29, 1969, above referred to. In that practice, the shadow area of contact assembly 12 and arm 32 is adjusted to partially deter flow of fluid past assembly 12 and cause it to flow laterally from tray 10 and hence cause lateral travel of the initiated charge from the tray. Optionally, a by-pass on the outside of the tray 10 with one end opening into conduit 11 and the other opening into guide tray 10 to laterally deliver fluid from conduit 11 against the charge can be utilized to move the initiated charge laterally from the firing device.

In another embodiment as disclosed and illustrated in the above referred to parent application, a tray member 10 is not required in the firing mechanism. In that practice the conduit conveys the charge assembly along a line of forward travel for contact with a contact assembly 12. The supporting arm member for contact member 12 is adapted to pivot about a point above guide member 10 to thereby pivotally move out of the path of forward travel of the charge to permit the charge to move linearly, after electrical initiation, from the device into the adjacent seismic area for the detonation.

In still another embodiment disclosed and illustrated in the above referred to copending parent application, the contact assembly 12 is supported on an arm of a bell crank lever assembly facing its interior toward the forward moving charge and laterally away from the top side of the guide assembly, and, in response to impact, the travel of the electrically initiated charge assembly from the firing device is directed by a sweeping action of the bell crank lever, about its pivot.

Contact assembly 12 can be assembled in any suitable manner. Thus, see FIGS. 2, 2A, 2B, 3 and 4, a separate dielectric body unit 37 can be contoured to provide the troughed end surfaces in quadrants A–D, incl., with a peripheral cut-out on the forward end for seating header body 13, and passageways 21'–24', incl., are formed therethrough.

A suitable liquid metallizing compound such as a liquid molybdenum-manganese mixture is then deposited on each of the troughed dielectric surfaces and extended a short distance into each of the passageways 21'–24', incl., connecting therewith, followed by insertion of pins 21–24 in the corresponding passageways into electrical contact with the metallized liquid at the rear of each passageway, and extending each conductor pin from the respective mass of liquid metal through the header body 13 for connection with an external power source. Similarly, a small mass of liquid metallized compound is placed on the peripheral notched surface of body 37, and header 13 is then seated in the thus "peripheral notch" of body 37 rearward of threads 20 for subsequent formation of seal 38. The resulting combination of dielectric body and header body with the metallized liquid masses applied as described, is then oven heated to braze the metallic coating and seal material to the assembly parts to provide brazed seal 38 connecting header body 13 and dielectric piece 15 including brazed electrical contact of the conductor pins with their respective electrical conductor surfaces 16–19, as specifically illustrated with reference to brazed seals 16' and 17' of FIG. 2. The conductors 21–24, incl., extending from dielectric body 37 are supported in spaced apart relationship in any suitable manner such as by a suitable potting material in section 28 of housing 26, or, as illustrated, by insertion of a ceramic space element 40 having spaced apart passageways 21''–24'', incl., each positioned for accepting, and supporting, one of conductor pins 21–24 for extension of same to suitable electrical connecting means for connection with the firing current outside the firing device. In the emplacement of spacing element 40, it is first metallized on its circumference and then solderplated over the metallized surface; and it is then positioned at the forward end of section 28 in engagement with the conductor pins extending therethrough, and oven-soldered to the header inner wall. The soldering step is effected subsequent to the completion of the sealing, or brazing, steps described with reference to dielectric pins 15 and conductor surfaces 16–19.

System and method of the invention are diagrammatically illustrated with reference to FIG. 6. Referring to FIG. 6, charge assembly storage 71 on deck 72 of tow boat 73 provides for storage of a supply of electrically initiatable charge assemblies such as of FIG. 5. Charge assemblies from storage 71 are sequentially loaded into cartridge loader, or breech block assembly, 74 through hinged top 76. Water pump system 77 supplies water from water body 80 under pressure via intake and discharge lines 78 and 78' respectively to loader 74 at the rear 79 thereof. Reel 81 on boat deck 72 supports a streamer cable described hereinafter. Flexible seismic charge deliverying hose 82 extends from loader 74 to a conveying conduit of a firing device of the invention, as for example, conduit 11, of FIG. 1, for sequential delivery of the electrically initiatable charge assemblies for initiation and firing, as the firing device is towed by boat 73 through the seismic exploration area. Water, under pressure, from pump system 77 forces travel of each charge, from loader 74 through hose 82 and into and through the firing device 9, as described hereinabove, and connecting with suitable electric power source 70 on deck 72.

Streamer cable assembly 83, of conventional design, comprises a hydrophone cable 84 and tow cable 84'; cable 84 contains a plurality of hydrophone groups 86 integrally connected in spaced apart relationship along the entire length thereof, and is connected at one end by tow cable 84' to reel assembly 87 for reeling and towing. Suitable well-known means (not shown) are associated with streamer cable assembly 83 to stabilize its position at a predetermined depth in the body of water; and suitable means (not shown) for communicating hydrophone groups 86 with recorder means on the boat deck, extend from within cable 84 along side tow cable 83 via reel assembly 73.

In practice, streamer assembly 83 is towed through the water body during which time the seismic charges are detonated outside the system at predetermined intervals, and distances, to initiate seismic shock at the predetermined points in the test area. Disturbances produced by the shot, or shock, are detected by the hydrophone groups which convert those pressure variations into electric signals which are then communicated to the boat for recording.

In preferred practice, particularly as illustrated with reference to FIG. 6, the invention provides for direct supply of firing energy to, and from, the emplaced charge via individual insulated supply and return lines permanently supported as a single strand on the delivery conduit. The invention thus eliminates the need for unwieldy leg wire type communication for each individual charge utilized in conventional underwater firing systems; and it also maintains the surrounding water body electrically neutral with elimination of safety hazards associated with accidental firing of the charge by action of stray currents, static charges, radio signals and the like, utilized in conventional firing systems in which the firing circuit is grounded along a conductive path through the water body for return connection with the power source. However, it is to be understood that it is within the scope of the invention to utilize any suitable firing circuit for communicating firing energy to the seismic charge when the latter is delivered to the firing mechanism for firing.

The invention further provides that, during seismic firing, the time-zero point can be measured and recorded directly in response to detonation of the charge in view of the invention's controlled positioning of the charge for detonation, thereby eliminating need for measuring the time-zero point in response to explosion of the resistance wire in conventional electrically fired seismic systems in which the charge cannot be reliably positioned for that purpose.

Although method and system of the invention illustrated with reference to FIG. 6, each involves operation of a single firing device from a boat deck, it is often advantageous from the standpoint of practicability to have a plurality of the firing devices available for such operation completely independently of the other. Availability, and use of a plurality of such independently operated firing devices provides for (1) a routine maintenance of one device, and associated system, during "on-time" of another, without interrupting continuous profiling operations, (2) the operation of a plurality of the devices simultaneously for increased seismic energy; and (3) operation of the devices, alternately, to meet high multiplicity requirements.

It will be evident to those skilled in the art, various modifications can be made or followed, in light of the foregoing disclosure and discussion without departing from the spirit or scope of the disclosure or from the scope of the claims.

What I claim and desire to protect by letters patent is:

1. A firing device for initiating electrically initiatable seismic charges assemblies having a delay period intermediate initiation and detonation of same, and then delivering the initiated charge assemblies for detonation outside the system, which comprises means for sequentially directing said charge assemblies along a path of continuous forward travel for electrical initiation of same; contact means, at a forward point on said path of travel, for receiving electric current for electrically initiating said charge assemblies and disposed in a stationary position for intercepting contact with said charge assemblies as they travel along said path to transfer said current to said assemblies for initiation of same; and means in response to contact of said charge assemblies with said contact means for directing the thus initiated charge assemblies from said firing device during said delay period.

2. In a firing device of claim 1, open means for sequentially guiding said charge assemblies along said path of forward travel; means for conveying said charge assemblies sequentially to said guiding means and then into said path of forward travel; and said contact means supported at a forward point on said guiding means.

3. In a firing device of claim 2, said contact means spaced in a central portion of said path of forward travel, and stationary means forward of said contact means for impact with the forwardly moving initiated charge assemblies to direct travel of each said initiated assembly from said firing device, through an open side of said guide means.

4. In a device of claim 3, a conduit as said conveying means; and a tray member as said open guide means, at one end of said conduit.

5. In a firing device of claim 4, said conduit and said tray member constituting an integral unit of construction.

6. In a firing device of claim 3, said contact means comprising a rigidly supported dielectric body having at least one pair of electrical conductor surfaces electrically insulated from the other and facing said conduit; means for respectively connecting the member surfaces of said pair(s) with opposite poles of a source of firing current; and said pair(s) of conductor surfaces being positioned to engage said seismic charge in said contact.

7. A firing device of claim 6, wherein said dielectric body is attached to said tray member and is elongated and disposed substantially coaxially with said conduit; two separate pairs of said electrical conductor surfaces, and each said conductor surface disposed in a separate quadrant on the end of said dielectric body facing said conduit.

8. In a firing device of claim 7, each said conductor surface supported on a central portion of, but spaced apart from the boundary radii forming, the dielectric quadrant surface containing same.

9. In a firing device of claim 8, said dielectric body being substantially cylindrical, and the dielectric surface of each said quadrant extending as a trough from the center of the diametric cross section forwardly of said dielectric body through the perimeter thereof.

10. In a firing device of claim 9, said dielectric surface of said body, in each said quadrant, being of V-shape having the crest formed by the boundary radii forming same and a valley extending from the quadrant center toward the forward end of said dielectric body and through the quadrant side; a layer of an electrically conductive material supported on each quadrant surface, spaced from the boundary radii of said quadrant surface, and covering substantially the remainder thereof, whereby each electrically conductive layer is electrically insulated from the other; and an electrically conductive lead forwardly extending through said dielectric body from electrical contact with each conductor surface; and means for respectively connecting any pair of said leads with opposite poles of a firing current source external to said firing device.

11. A firing device of claim 10, wherein each said valley extends from the quadrant center at an angle of from 20° to 30° with the longitudinal axis of said dielectric body, and each conductor surface is spaced from its boundary radii so as to form a resulting continuous strip of said dielectric surface free from said conductive material, to thereby electrically insulate each said surface from the others.

12. A firing device for sequentially initiating delay type electrically initiatable end-recessed elongated seismic charge assemblies in an underwater siesmic test area, and then directing the thus initiated charges from the firing device during the delay period, and said charge assemblies having electrical conductor leads extending from the interior into the recessed end thereof, for carrying the requisite firing current, said firing device comprising a conduit for sequentially conveying said charge assemblies, recessed end first, into a path of forward travel in the underwater test zone, and an elongated tray shape member connecting with the forward end of said conduit in substantially coplanar relationship with a wall portion of said conduit for guiding said charge assemblies along said path; a rigidly secured arm member extending from said guide member across a central portion of the forward end thereof and across the extended longitudinal axis of said conduit in a plane substantially normal to said axis, at a distance from said conduit of at least 1.1 times the length of each said charge assembly, but so extending from said guide member a distance less than the diametric distance across said conduit; a cylindrical dielectric body disposed at one end of said guide member substantially coaxially with said conduit, and supported at its forward end in said arm member and within the confines of same, thereby providing; together with said arm, an open area on said path adjacent said arm and dielectric body supported therein; a layer of an electrically conductive material supported on each quadrant surface of said dielectric body facing said conduit, and spaced from the boundary radii of said quadrant surface but covering substantially the remainder thereof, whereby each electric conductive layer is electrically insulated from the other; an electrically conductive lead forwardly extending through said dielectric body from electrical contact with each conductor surface; means for respectively connecting any pair of said leads with opposite poles of a firing current source external to said firing device; and said cylindrical dielectric member rearwardly extending from said arm member a distance not greater than the depth of said recess portion of said charge.

13. An explosive charge assembly for underwater seismic exploration, adapted to be electrically initiated upon traveling in the seismic shooting zone into contact with opposite poles of an electric firing current source and then directed away from said contact for subsequent detonation, comprising an elongated shell having a closed interior along a portion of its length, and an open end section adjacent the shell interior; a small seismic explosive charge, as the main explosive charge, within said shell interior, and an electrically initiatable primer device for said main charge supported in said main charge and containing electrical conductor leads extending into said open end shell section for conveying electrical firing current from said source for initiation of said primer; said conductor leads extending into said end section in substantially parallel and rigid relationship, and spaced apart at an angle greater than 90° having its vertex on the longitudinal axis of said shell and measured in a plane normal to said axis.

14. An explosive charge assembly of claim 13 wherein said primer comprises a closed elongated shell, said pair of conductor leads extending into, and terminating in, said primer shell, through one end thereof, and a resistance wire within said primer shell connecting the terminating ends of said conductor leads; an ignition charge within said primer shell disposed in operative communication with said resistance wire to ignite in response to heat developed by passage of electric current through said bridge wire via said conductor leads; a high explosive within said primer shell, as a base charge spaced from said ignition charge; a primer charge intermediate said ignition charge and said base charge; a slow burning composition, as a delay fuse, intermediate said primer charge and said ignition charge, and ignitable in response to ignition of said ignition charge and spaced in ignition relationship therewith; said primer charge being detonatable in response to ignition of said delay fuse composition and spaced in detonating relationship therewith; and said base charge being detonatable in response to detonation of said primer charge and spaced in detonating relationship therewith.

15. A seismic charge assembly of claim 14 in which said seismic explosive charge is a nitrocarbonitrate.

16. A seismic charge assembly of claim 15 containing from ⅛ to 3 lbs. of said nitrocarbonitrate charge.

17. An explosive charge assembly of claim 16 in which the total length of the cartridge shell is within the range of from 1¾ to 3 inches.

18. A complete seismic charge assembly of claim 17 wherein said primer charge of said primer device comprises a combination of (1) a diazodinitrophenol wafer, in direct open communication with said delay fuse, and of sufficiently high density to ignite in response to ignition of said delay fuse, and (2) a mass of diazodinitrophenol intermediate said wafer and said base charge, and of sufficiently low density to detonate in response to ignition of said wafer.

19. A system for generating seismic disturbances in a body of water which comprises: a movable platform; means on said platform for storage of electrically initiatable seismic delay type explosive charge assemblies; a firing device, as a submersed firing station comprising (1) means for sequentially directing said charge assemblies along a path of continuous forward travel for electrical initiation of same; (2) means, at a forward point on said path of travel, for receiving electric current for electrically initiating said charge assemblies and for contacting said charge assemblies as they travel along said path to transfer said current to said charge assemblies for initiation of same; and (3) means for directing the thus initiated charge assemblies from said firing device during the delay period; a delivery conduit connecting said platform with said directing means of said submersed firing station; fluid pressure generating means on said platform connecting with said delivery conduit for sequentially moving said charge assemblies from said platform through said delivery conduit to said directing means, and then into and along said forward path of travel for said initiation.

20. A system of claim 19 in which said firing device comprises (1) open means for sequentially guiding said charge assemblies along said path of continuous forward travel, and (2) means for conveying said charge assemblies sequentially to said guiding means and then into said path of continuous forward travel.

21. A seismic exploration method wherein complete delayed electrically initiatable seismic charge assemblies are emplaced and fired in an underwater zone to provide energy for a seismic record, said method comprising sequentially conveying a plurality of said charge assemblies into, and along, a path of forward travel in said underwater zone; sequentially contacting said assemblies while they travel with a contact means disposed across said path of travel and including opposite poles of a firing current source so as to electrically initiate said charge assemblies concurrently with said contacting; and during the period of delay, sequentially directing travel of the thus initiated charge assemblies from the zone of said initiation into an adjacent area in said underwater zone for detonation.

22. A seismic exploration method wherein complete delayed electrically initiatable seismic charge assemblies are emplaced and fired in an underwater zone to provide energy for a seismic record, said method comprising sequentially conveying a plurality of said charge assemblies into, and along, a path of forward travel in said underwater zone; sequentially contacting said assemblies while they travel with a contact means disposed across said path of travel and including opposite poles of a firing current source so as to electrically initiate said charge assemblies concurrently with said contacting; and during the period of delay, sequentially directing the travel of the thus initiated charge assemblies pivotally about said contact means as a pivot point.

* * * * *

UNITED STATES PATENT AND TRADEMARK OFFICE
CERTIFICATE OF CORRECTION

PATENT NO. : 3,937,296
DATED : February 10, 1976
INVENTOR(S) : R. R. Larson

It is certified that error appears in the above-identified patent and that said Letters Patent are hereby corrected as shown below:

Column 10, line 55;

"150" should read -- 1/8 --

Column 14, line 66;

"lines" is omitted should read

-- communication lines --

Signed and Sealed this

Twentieth Day of July 1976

[SEAL]

Attest:

RUTH C. MASON
*Attesting Officer*

C. MARSHALL DANN
*Commissioner of Patents and Trademarks*